J. C. GIBBS.

ICE CREAM FREEZER.

APPLICATION FILED AUG. 26, 1920.

Reissued Mar. 15, 1921. 15,062.

INVENTOR
John C. Gibbs
BY HIS ATTY.
Frank A. Clent

UNITED STATES PATENT OFFICE.

JOHN C. GIBBS, OF LANCASTER, PENNSYLVANIA, ASSIGNOR TO LIBERTY CAN & SIGN CO., INC., OF LANCASTER, PENNSYLVANIA, A CORPORATION OF PENNSYLVANIA.

ICE-CREAM FREEZER.

15,062. Specification of Reissued Letters Patent. Reissued Mar. 15, 1921.

Original No. 1,334,748, dated March 23, 1920, Serial No. 317,747, filed August 15, 1919. Application for reissue filed August 26, 1920. Serial No. 406,232.

*To all whom it may concern:*

Be it known that I, JOHN C. GIBBS, a citizen of the United States, residing in the city and county of Lancaster, State of Pennsylvania, have invented a new and useful Ice-Cream Freezer, of which the following is a specification.

My invention consists of improvements in an ice cream freezer as will be hereinafter described and definitely pointed out in the claims.

The invention is satisfactorily illustrated in the accompanying drawing, but the important instrumentalities thereof may be varied, and so it is to be understood that the invention is not limited to the specific details shown and described, as long as they are within the spirit and scope of the claims.

Similar numerals of reference indicate corresponding parts in the figures.

Figure 1:
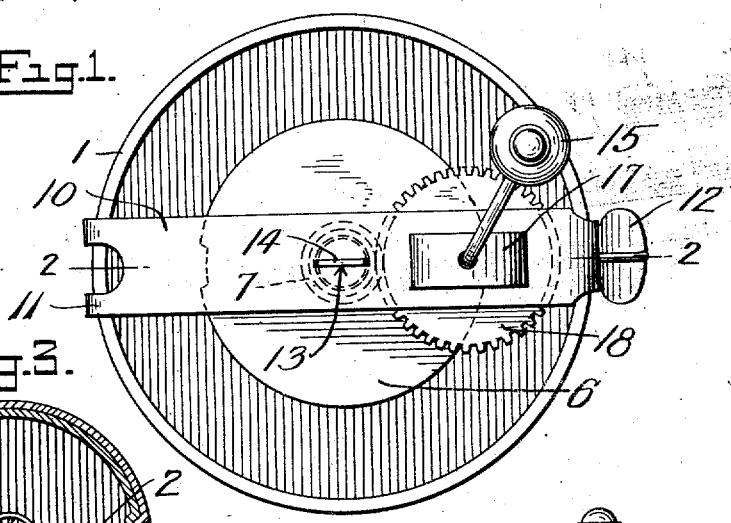
Figure 1 represents a top or plan view of an ice cream freezer embodying my invention.

Referring to the drawings, 1 designates the can of the freezer, and 2 designates the dasher therein, and 3 designates the tub or pail, which members excepting the features of my invention applied thereto are of usual construction.

The can is mounted on the step 4 on the bottom of the tub whereby said can may be rotated thereon. The dasher is mounted on the step 5 on the bottom of the can whereby it is supported thereon, it being understood that the can revolves around the dasher and the latter will be held stationary by means as will be hereinafter described.

6 designates the cover of the can, the same having on the top thereof centrally thereon the pinion 7 in which is a vertically arranged circular opening or bore 8, the latter being in communication with the circular opening 9 in the cover 6 of the can.

10 designates a bridge or cover-piece which at one end may be hinged as at 11 to the top of the tub 3 and may be provided at the other end with the catch 12 which engages with the top rim of the tub for locking said bridge in operative position with the latter. In said bridge is the slot 13 which is in communication with the opening 8 in the pinion 7 and consequently with the opening 9 in the cover 6 of the can.

Rising from the top of the dasher 2 is the tongue 14 which is passed through the opening 9, the opening 8, and slot 13, said tongue being flat in form, and said slot being similarly shaped whereby, as the bridge is stationary and receives said tongue in said slot as has been stated, the dasher is held stationarily while the can rotates around the same.

15 designates a crank handle whose limb 16 is mounted on the bearing 17 on the bridge 10, passes through the latter and has on its lower end which is below said bridge the spur wheel 18 which entering the tub is adapted to engage the pinion 7.

The operation is as follows:—

The crank handle is operated whereby it imparts rotation to the spur wheel and consequently to the pinion 7, thus rotating the can in which the ice cream mixture had been duly placed and the tube suitably iced, the ice cream will be easily and quickly produced. When this is accomplished the bridge is unlocked and raised when the spur wheel 18 follows the same and so removed from the pinion 7, the bridge also clearing the tongue 14. Then the cover of the can may be removed when the contents of the can are accessible, for further action usual in such cases.

Figure 3:
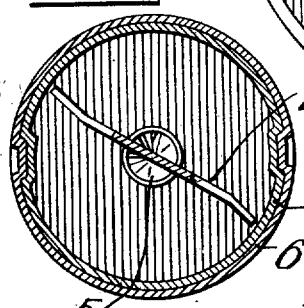
Fig. 3 represents a horizontal section of a portion on line 3—3 of Fig. 2.
Figure 2:
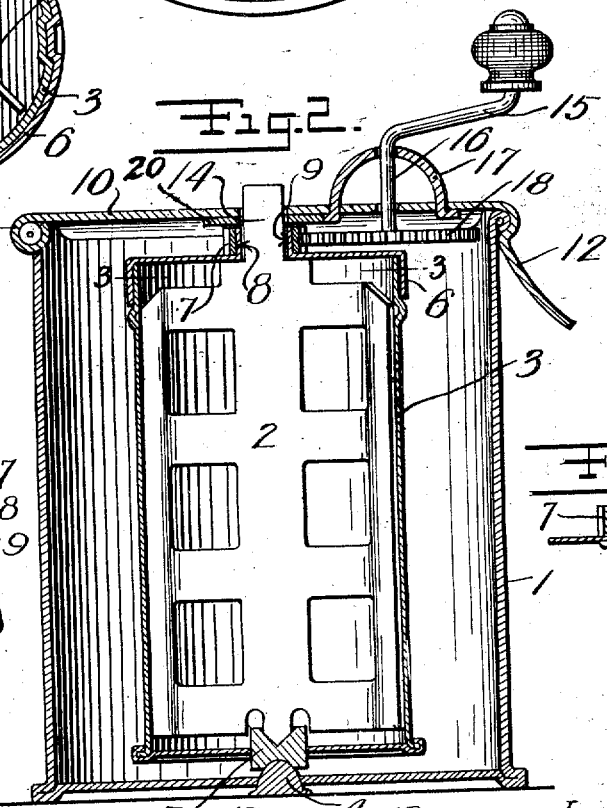
Fig. 2 represents a central vertical section on line 2—2 of Fig. 1.

The cover 6 is removably interlocked with the top of the can so that the latter will rotate with said cover by means of the interengaging depressions 19 in the sides of the can of the rim of the cover, as most plainly shown in Fig. 3.

Secured to the under side of the bridge is the plate 20 in which is a slot 21 which registers with the slot 13 and serves to reinforce said bridge about said slot 13, the walls of which latter are subjected to strain owing to their embracing action of the tongue 14 to hold the dasher stationary.

When the catch 12 is released and the bridge 10 raised it turning on its hinge 11, the spur wheel 18, crank handle 15 and the bearing 17 follows said bridge, they being fixtures of the latter. When the bridge is returned to its operative position the spur wheel 18 intermeshes with the pinion 7 and is ready to operate the latter by the action of the crank handle 15.

The pinion 7 is attached to the cover of the can by the sleeve 22 which is fitted in the bore 8 of the pinion and secured thereto, and has its lower end swaged or otherwise firmly engaged with the wall of the opening. The bearing 17 for the limb 16 of the crank handle 15 consists of a plate bent arch shaped having in its crown an opening to receive freely the upper portion of said limb 16, the lower portion of the latter passing freely through an opening in the bridge 10 thus steadily supporting said limb at different places. The limbs of said bearing are passed through openings in the bridge and provided with feet which are turned horizontally on the underside of the bridge and fixed thereto, thus holding said bearing firmly connected with said bridge and preventing wabbling and rattling of the crank handle and the spur wheel 18.

The reinforcing plate 20 for the bridge 10 about the slot 13 therein serves also to assist in retaining the pinion 7 in position and prevents the same from rising, and likewise preventing the cover 6 of the can from upward disconnection and upward bulging of the bridge 10.

Figure 6:
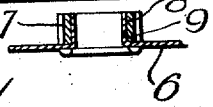
Fig. 6 represents a vertical section of a detached portion.
Figure 5:
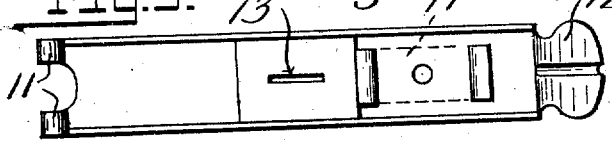
Fig. 5 represents a bottom plan of the bridge or cover-piece of the ice-tub.

As the pinion 7 is secured to the sleeve 22 and the lower end of the latter is flanged and so engages the underside of the cover 6, see Fig. 6, a strong connection is provided for said sleeve and pinion with said cover, and said pinion and sleeve are prevented from slipping around on said cover.

Figure 4:
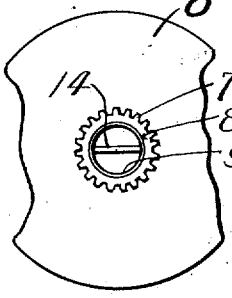
Fig. 4 represents a top plan view of a portion of the can of the freezer.

It will be observed that a feature of importance lies in so shaping the tongue 14 that in passing through the central hole in the can-top a considerable hole or passage is formed at either side of the tongue, as specially observed in Fig. 4, the tongue being narrow and flat and the hole being round. This not only provides for ample aeration of the contents of the can but also enables the consistency of the cream to be tested from time to time by swinging off the bridge-member 10 and inserting a straw into either one of the passages at the sides of the tongue. This is further advantageous in that additional cream or flavorings may be poured into the can at any time after the can-top is fastened on the can.

Another advantage of my invention lies in the substantial manner of anchoring the journal-bracket 17 to the bridge. It is one of the objects of my invention to construct all the parts possible out of stamped-up sheet metal, thus greatly increasing economy in manufacture. This construction and arrangement of the journal bracket enables me to make not only the bridge of sheet metal but also the bracket, in that, by inserting the foot-members of the bracket through slots in the bridge-plate and providing them with lateral flanges secured to the inner face of the bridge-plate, I secure a well-braced structure, a well braced structure being especially desirable at this point in view of the fact that great strain is brought upon the bracket as the cream stiffens.

It will be observed also that a feature of importance lies in so constructing the dasher and its anchoring tongue that the same may be stamped out of a single sheet of metal. If any gain in the cost of manufacture is to be secured in this manner, it is obvious that the dasher must be made of comparatively thin metal, and this requires that the anchoring tongue 14 shall have considerable width in order to withstand the considerable torsional strain it is subjected to when the cream becomes hard. It is also necessary that this comparatively wide tongue 14 shall have a comparatively substantial bearing in the bridge-plate, since the more extensive this bearing is the thinner the dasher-plate and the bridge-plate may be made. This broad bearing is obtained by making the slot 13 in the bridge-plate sufficiently long to embrace the tongue its full width on both sides. Furthermore, the slot 13 is arranged longitudinally of the bridge, thus avoiding the weakening of the bridge that would occur if this comparatively long slot were arranged transversely thereof. The advantage in making the dasher a single thin flat plate lies not only in the fact that it may be stamped up from a single sheet of material, but also in the fact that it insures a thorough stirring of the mass throughout the area of the can. In particular, it will be noted that the vertical central part of my dasher is not a shaft in the true sense, but is in fact a thin flat plate extending across the center of the can, whereby the area occupied by the dasher in the can is reduced to a minimum and whereby all dead spaces are eliminated, it being obvious that when my dasher is relatively rotated the cream in all parts of the can and especially around the vertical center thereof is given a very substantial movement in one direction or another. In dashers embodying a round, or substantially round, shaft and radial arms, there are zones in the cream mass that are not agitated at all or are only slightly moved while the dasher is in operation; this is eliminated with my type of dasher, the flat central plate, the flat radial plates and the flat edge plates or scrapers being so arranged that no part of the cream can escape violent agitation.

Another feature of my invention lies in the peculiar manner in which I have anchored the pinion 7 to the can-cover. This is done by fastening the pinion to a sheet metal upstanding rigid tubular member carried by the bridge-plate, this tubular member fitting the interior of the pinion. This not only firmly anchors the pinion to the can-top but also gives me the wide opening that I need for the flat dasher-tongue 14. This construction is especially advantageous and necessary where, as in the present case, it is desirable to reduce the expense of the freezer by using sheet steel of the thinner grades where the weight of the freezer is to be reduced to a minimum. In this way, I reduce the metal in the pinion to a minimum and also anchor it with sufficient rigidity and permanence to withstand the comparatively great strain it is subjected to in operation.

I claim:—

1. In an ice cream freezer, an ice-can, a metal bridge-member having transverse slots, a metal journal-bracket mounted thereon and having depending limbs extending through said slots and bent laterally at their lower extremities, these laterally-bent lower extremities being fastened to the under side of the bridge-plate, a driving crank-shaft journaled in said journal-bracket, and gearing connecting this shaft to the rotary element of the freezer.

2. In an ice cream freezer, a rotatable can, a dasher stationary therein, a tub, a bridge removably connectible with said tub and adapted to control said dasher against rotation, a gear wheel on the cover of said can secured thereto, a crank handle having a bearing on said bridge, a gear wheel on said handle, said gear wheel removably intermeshing with said pinion, and means on said bridge adapted to interlock the latter with said tub and retain said gear wheel and pinion in engagement, said bearing for the crank handle consisting of a plate substantially arch-shaped having one limb of said crank handle mounted in the crown thereof and having its leg portions mounted on said bridge and provided with laterally turned feet which are secured to the latter.

3. In an ice cream freezer, a can, a cover therefor, a dasher, a gear wheel on said cover, a movable bridge in said tub, a crank handle mounted on said bridge, a reinforcing plate on said bridge about the wall of the slot therein, and a gear wheel on said handle, said gear wheels being adapted to intermesh, said dasher having an upwardly extending flat tongue, said gear wheel on said cover having a circular bore in which said flat tongue is received, said bridge having therein a slot, and said reinforcing plate having therein a slot, said slots conforming to said flat tongue and being in register with said bore.

4. In an ice cream freezer, a tub, a bridge thereon, a rotatable can, a stationary dasher in the latter, a pinion on the cover of said can, a tubular sleeve on the cover of the can, said pinion having a bore in its hub portion and fitted on and secured to said sleeve, a spur wheel on said bridge adapted to mesh with said pinion, an upwardly extending flat tongue on said dasher adapted to pass through said cover, pinion and bridge, the latter having therein a slot adapted to receive said tongue and embrace the same, and a reinforcing plate on said bridge having therein a slot which is adapted to register with the slot in said bridge, both slots being adapted to register with said bore.

5. In an ice cream freezer embodying a rotary cream-can having a removable metal cover provided with a rigid upstanding central tubular member, a pinion surrounding this upstanding tubular member and fastened thereto, a dasher within the cream-can having a flat anchoring tongue extending up through said tubular member to thereby form two passages one at either side thereof, and means for rotating said cream-can through the medium of said pinion.

6. An ice cream freezer embodying a cream-can having a circular central passage in its cover, a flat dasher in the cream-can having an anchoring tongue extending up through said passage, this anchoring tongue being flat to thereby form two passages one at either side thereof, means engaging the tongue at its upper end to anchor the dasher, and means for rotating the cream-can.

In testimony whereof I affix my signature in presence of two witnesses.

JOHN C. GIBBS.

Witnesses:
MERLE R. BURKHART,
ELSIE I. BICKHART.